(12) United States Patent
Ezell et al.

(10) Patent No.: US 9,518,210 B2
(45) Date of Patent: Dec. 13, 2016

(54) COMPOSITIONS AND SYSTEMS FOR COMBATTING LOST CIRCULATION AND METHODS

(75) Inventors: Ryan G. Ezell, Spring, TX (US); B. Raghava Reddy, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/460,266

(22) Filed: Apr. 30, 2012

(65) Prior Publication Data

US 2012/0298357 A1 Nov. 29, 2012

Related U.S. Application Data

(62) Division of application No. 12/621,329, filed on Nov. 18, 2009.

(51) Int. Cl.
C09K 8/504 (2006.01)
C09K 8/508 (2006.01)
C09K 8/512 (2006.01)

(52) U.S. Cl.
CPC ............. *C09K 8/5045* (2013.01); *C09K 8/508* (2013.01); *C09K 8/512* (2013.01)

(58) Field of Classification Search
None
See application file for complete search history.

(56) References Cited

U.S. PATENT DOCUMENTS

| | | | |
|---|---|---|---|
| 2,837,163 A * | 6/1958 | Ramos et al. | 166/250.03 |
| 2,940,729 A * | 6/1960 | Rakowitz | 166/295 |
| 3,044,548 A * | 7/1962 | Perry et al. | 166/254.2 |
| 3,223,162 A * | 12/1965 | Burge | 166/295 |
| 3,580,879 A * | 5/1971 | Higashimura et al. | 524/809 |
| 4,042,032 A | 8/1977 | Anderson et al. | |
| 4,070,865 A | 1/1978 | McLaughlin | |
| 4,085,160 A | 4/1978 | Anderson et al. | |
| 4,312,605 A | 1/1982 | Clarke | |
| 4,318,835 A | 3/1982 | Clarke | |
| 4,339,370 A | 7/1982 | Parker | |
| 4,629,747 A | 12/1986 | Wu et al. | |
| 4,643,255 A * | 2/1987 | Sandiford et al. | 166/295 |
| 4,683,949 A | 8/1987 | Sydansk et al. | |
| 4,745,138 A * | 5/1988 | Thanawalla et al. | 522/120 |
| 4,829,100 A | 5/1989 | Murphey et al. | |
| 4,836,940 A * | 6/1989 | Alexander | 507/119 |
| 5,058,676 A | 10/1991 | Fitzpatrick et al. | |
| 5,128,390 A | 7/1992 | Murphey et al. | |
| 5,250,645 A | 10/1993 | Maurer | |
| 5,335,726 A * | 8/1994 | Rodrigues | 166/295 |
| 5,342,149 A | 8/1994 | McCabe et al. | |
| 5,358,051 A * | 10/1994 | Rodrigues | 166/295 |
| 5,470,425 A | 11/1995 | Disch | |
| 5,486,557 A | 1/1996 | Akerberg | |
| 5,658,861 A | 8/1997 | Nelson et al. | |
| 5,836,392 A | 11/1998 | Urlwin-Smith | |
| 5,866,516 A * | 2/1999 | Costin | 507/103 |
| 5,913,364 A | 6/1999 | Sweatman | |
| 5,989,336 A | 11/1999 | Carpenter et al. | |
| 6,016,879 A | 1/2000 | Burts, Jr. | |
| 6,167,967 B1 | 1/2001 | Sweatman | |
| 6,176,315 B1 | 1/2001 | Reddy et al. | |
| 6,176,345 B1 | 1/2001 | Perkins et al. | |
| 6,186,230 B1 | 2/2001 | Nierode | |
| 6,187,839 B1 | 2/2001 | Eoff et al. | |
| 6,192,986 B1 | 2/2001 | Urlwin-Smith | |
| 6,196,317 B1 | 3/2001 | Hardy | |
| 6,258,757 B1 | 7/2001 | Sweatman et al. | |
| 6,321,841 B1 | 11/2001 | Eoff et al. | |
| 6,427,775 B1 | 8/2002 | Dusterhoft et al. | |
| 6,446,722 B2 | 9/2002 | Nguyen et al. | |
| 6,607,305 B2 | 8/2003 | Fischer et al. | |
| 6,742,590 B1 | 6/2004 | Nguyen | |
| 6,755,245 B2 | 6/2004 | Nguyen et al. | |
| 6,762,156 B2 | 7/2004 | Heathman et al. | |

(Continued)

FOREIGN PATENT DOCUMENTS

CN 101724384 A 6/2010
EP 1365104 A1 11/2003

(Continued)

OTHER PUBLICATIONS

Baroid Fluid Services brochure entitled "FlexPlug® service—for curing lost circulation, improving wellbore pressure containment and drilling ahead," Apr. 2008, 4 pages, Halliburton.
Baroid Fluid Services brochure entitled "FUSE-IT™—lost circulation treatment," May 2006, 2 pages, Halliburton.
Baroid Fluid Services brochure entitled "STEELSEAL® lost circulation materials—high-performance resilient graphic carbon material for loss prevention, rapid remediation and wellbore strengthening," Apr. 2008, 2 pages, Halliburton.
Baroid Fluid Services brochure entitled "THERMA-VIS™," Sep. 5, 2006, 1 page, Halliburton.
Baroid Fluid Services brochure entitled "Wellbore Stress Management™ service," Sep. 2006, 2 pages, Halliburton.
Foreign communication from a related counterpart application—International Search Report and Written Opinion, PCT/GB2010/002138, Jun. 29, 2011, 15 pages.
Foreign communication from a related counterpart application, Invitation to Pay Additional Fees, PCT/GB2010/002138, Mar. 23, 2011, 5 pages.
Halliburton brochure entitled "Flexplug® OBM," Oct. 2005, 1 page, Halliburton.

(Continued)

*Primary Examiner* — Angela M DiTrani
(74) *Attorney, Agent, or Firm* — Haynes and Boone, LLP (57) ABSTRACT

A method of servicing a wellbore in a subterranean formation comprising placing a first stream comprising a dilute solution of a metal acrylate into a lost circulation zone in the subterranean formation; placing a second stream comprising an activator into the lost circulation zone; and forming a lost circulation material upon contacting of the metal acrylate and the activator, wherein the lost circulation material forms in from about 0 to about 60 minutes. A method of servicing a wellbore in a subterranean formation comprising placing a composition comprising a dilute solution of a cross-linkable material and an encapsulated activator into a lost circulation zone in the subterranean formation; and allowing the composition to set.

8 Claims, 2 Drawing Sheets

(56) References Cited

U.S. PATENT DOCUMENTS

| | | | |
|---|---|---|---|
| 6,764,981 B1 | 7/2004 | Eoff et al. | |
| 6,776,236 B1 | 8/2004 | Nguyen | |
| 6,823,939 B2 | 11/2004 | Bouwmeester et al. | |
| 6,843,841 B2 | 1/2005 | Reddy et al. | |
| 6,866,099 B2 | 3/2005 | Nguyen | |
| 6,881,708 B2 | 4/2005 | Reddy et al. | |
| 6,936,574 B2 | 8/2005 | Dao et al. | |
| 6,951,250 B2 | 10/2005 | Reddy et al. | |
| 7,128,148 B2 | 10/2006 | Eoff et al. | |
| 7,287,587 B2 | 10/2007 | Reddy et al. | |
| 7,299,871 B2 * | 11/2007 | Hanes, Jr. | 166/295 |
| 7,331,390 B2 | 2/2008 | Eoff et al. | |
| 7,544,641 B2 | 6/2009 | Robertson et al. | |
| 7,642,223 B2 | 1/2010 | Santra et al. | |
| 7,690,429 B2 | 4/2010 | Creel et al. | |
| 7,757,765 B2 | 7/2010 | Hilleary et al. | |
| 8,043,997 B2 | 10/2011 | Whitfill et al. | |
| 8,100,179 B2 * | 1/2012 | Hermes et al. | 166/288 |
| 2004/0023815 A1 | 2/2004 | Burts, III | |
| 2004/0048751 A1 * | 3/2004 | Dao et al. | 507/200 |
| 2006/0234871 A1 | 10/2006 | Dalrymple et al. | |
| 2008/0060811 A1 | 3/2008 | Bour et al. | |
| 2011/0114318 A1 | 5/2011 | Ezell et al. | |

FOREIGN PATENT DOCUMENTS

| | | |
|---|---|---|
| FR | 1113937 | 4/1956 |
| GB | 1303456 | 1/1973 |
| GB | 1514057 | 6/1978 |
| GB | 2384490 A | 7/2003 |
| WO | 0224771 A2 | 3/2002 |
| WO | 2011061504 A2 | 5/2011 |
| WO | 2011061504 A3 | 5/2011 |

OTHER PUBLICATIONS

Halliburton brochure entitled "H2Zero™ service," Apr. 2008, 2 pages, Halliburton.

Halliburton brochure entitled "HZ-10™ polymer," Oct. 2007, 2 pages, Halliburton.

Halliburton brochure entitled "HZ-20™ crosslinker," Jan. 2008, 2 pages, Halliburton.

Halliburton brochure entitled "OptiFlo II—delayed-release breaker," 1998, 2 pages, Halliburton Energy Services, Inc.

Halliburton brochure entitled "OptiFlo III—delayed-release breaker," 1998, 2 pages, Halliburton Energy Services, Inc.

Halliburton brochure entitled "Perm C—conformance additive," 1999, 2 pages, Halliburton Energy Services, Inc.

Halliburton brochure entitled "Perm D—conformance additive," 2000, 2 pages, Halliburton Energy Services, Inc.

Halliburton brochure entitled "PermSeal™ service—versatile, cost-effective sealants for conformance applications," Feb. 2009, 2 pages, Halliburton.

Halliburton brochure entitled "The PermSeal™ system—versatile, cost-effective sealants for conformance applications," Mar. 2002, 2 pages, Halliburton.

Halliburton brochure entitled "SandWedge® NT conductivity enhancement system—enhances proppant pack conductivity and helps prevent intrusion of formation material for improved long-term production," May 2005, 2 pages, Halliburton.

Halliburton brochure entitled "Thermatek(SM) service—helps meet the challenges of severe loss circulation, near wellbore water shutoffs and plugging operations," May 2005, 2 pages, Halliburton.

Halliburton manual entitled "Water management—identification and treatment of water-control problems for improved reservoir recovery efficiency," Dec. 2002, 175 pages, Halliburton.

Advisory Action dated Jul. 17, 2012 (3 pages), U.S. Appl. No. 12/621,329, filed Nov. 18, 2009.

Office Action dated Jan. 30, 2012 (25 pages), U.S. Appl. No. 12/621,329, filed Nov. 18, 2009.

Office Action (Final) dated May 9, 2012 (11 pages), U.S. Appl. No. 12/621,329, filed Nov. 18, 2009.

Walters, Harold G., et al., "Kinetic rheology of hydraulic fracturing fluids," SPE 71660, 2001, pp. 1-12, Society of Petroleum Engineers Inc.

Office Action dated Sep. 24, 2012 (15 pages), U.S. Appl. No. 12/621,329, filed Nov. 18, 2009.

Office Action (Final) dated Jan. 10, 2013 (15 pages), U.S. Appl. No. 12/621,329, filed Nov. 18, 2009.

Office Action dated Mar. 4, 2014 (19 pages), U.S. Appl. No. 12/621,329, filed Nov. 18, 2009.

Foreign communication from a related counterpart application—International Preliminary Report on Patentability, PCT/GB2010/002138, May 22, 2012, 12 pages.

Advisory Action dated Mar. 18, 2013 (3 pages), U.S. Appl. No. 12/621,329, filed Nov. 18, 2009.

Office Action (Final) dated Jun. 9, 2014 (14 pages), U.S. Appl. No. 12/621,329, filed Nov. 18, 2009.

Examination Report for GC Patent Application No. 2010-17154 mailed Sep. 11, 2014 (4 pages).

* cited by examiner

COMPOSITIONS AND SYSTEMS FOR COMBATTING LOST CIRCULATION AND METHODS

CROSS-REFERENCE TO RELATED APPLICATIONS

This application is a divisional of and claims priority to U.S. patent application Ser. No. 12/621,329 filed on Nov. 18, 2009, published as U.S. 2011/0114318 A1 and entitled "Compositions and Systems for Combating Lost Circulation and Methods of Using the Same," which is incorporated herein by reference in its entirety.

BACKGROUND OF THE INVENTION

This disclosure relates to compositions and systems for servicing a wellbore in a subterranean formation. More specifically, this disclosure relates to introducing compositions and systems into a wellbore penetrating a subterranean formation to reduce the loss of fluid to the formation.

A natural resource such as oil or gas residing in a subterranean formation may be recovered by drilling a well into the formation. The subterranean formation is usually isolated from other formations using a technique known as well cementing. In particular, a wellbore is typically drilled down to the subterranean formation while circulating a drilling fluid through the wellbore. After the drilling is terminated, a string of pipe, e.g., casing, is run in the wellbore. Primary cementing is then usually performed whereby a cement slurry is pumped down through the string of pipe and into the annulus between the string of pipe and the walls of the wellbore to allow the cement slurry to set into an impermeable cement column and thereby seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

Subsequently, oil or gas residing in the subterranean formation may be recovered by driving the fluid into the well using, for example, a pressure gradient that exists between the formation and the wellbore, the force of gravity, displacement of the fluid using a pump or the force of another fluid injected into the well or an adjacent well. The production of the fluid in the formation may be increased by hydraulically fracturing the formation. That is, a viscous fracturing fluid may pumped down the casing to the formation at a rate and a pressure sufficient to form fractures that extend into the formation, providing additional pathways through which the oil or gas can flow to the well. Unfortunately, water rather than oil or gas may eventually be produced by the formation through the fractures therein. To provide for the production of more oil or gas, a fracturing fluid may again be pumped into the formation to form additional fractures therein. However, the previously used fractures first must be plugged to prevent the loss of the fracturing fluid into the formation via those fractures.

In addition to the fracturing fluid, other fluids used in servicing a wellbore may also be lost to the subterranean formation while circulating the fluids in the wellbore. In particular, the fluids may enter the subterranean formation via lost circulation zones (LCZs) for example, depleted zones, zones of relatively low pressure, zones having naturally occurring fractures, weak zones having fracture gradients exceeded by the hydrostatic pressure of the drilling fluid, and so forth. As a result, the service provided by such fluid is more difficult to achieve. For example, a drilling fluid may be lost to the formation, resulting in the circulation of the fluid in the wellbore being too low to allow for further drilling of the wellbore. Also, a secondary cement/sealant composition may be lost to the formation as it is being placed in the wellbore, thereby rendering the secondary operation ineffective in maintaining isolation of the formation. Conventional solutions to preventing loss of wellbore fluids to an LCZ involve forming a viscous mass in the LCZ. Frequently, the viscous masses are easily deformable and may breakdown under fluid pressure, thereby allowing reestablishment of a fluid flow channel within the LCZ. Accordingly, an ongoing need exists for more effective compositions and methods of blocking the flow of fluid through LCZs in subterranean formations.

SUMMARY

Disclosed herein is a method of servicing a wellbore in a subterranean formation comprising preparing a composition comprising a base fluid, a thixotropic viscosifier, a gellable composition and a bridging material, applying a shear force to the composition such that the composition viscosity decreases, introducing the composition into a lost circulation zone in the subterranean formation, wherein the lost circulation zone comprises cavities greater than about 200 microns in diameter, decreasing the shear force applied to the composition, and allowing the composition to set in the lost circulation zone.

Also disclosed herein is a method of servicing a wellbore in a subterranean formation comprising placing a first stream comprising a dilute solution of a metal acrylate into a lost circulation zone in the subterranean formation, placing a second stream comprising an activator into the lost circulation zone, and forming a lost circulation material upon contacting of the metal acrylate and the activator, wherein the lost circulation material forms in from about 0 to about 60 minutes.

Further disclosed herein is a method of servicing a wellbore in a subterranean formation comprising placing a composition comprising a dilute solution of a cross-linkable material and an encapsulated activator into a lost circulation zone in the subterranean formation, and allowing the composition to set.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing compositions, wellbore servicing systems, and methods of employing the same. The disclosed compositions and methods may be utilized to plug and/or seal a LCZ thereby preventing, ceasing or substantially lessening the loss of fluids to such a zone. Hereinafter such compositions and systems employed to combat loss circulation are termed loss circulation combating compositions (LCCCs) and are described in greater detail herein.

Figure 1:
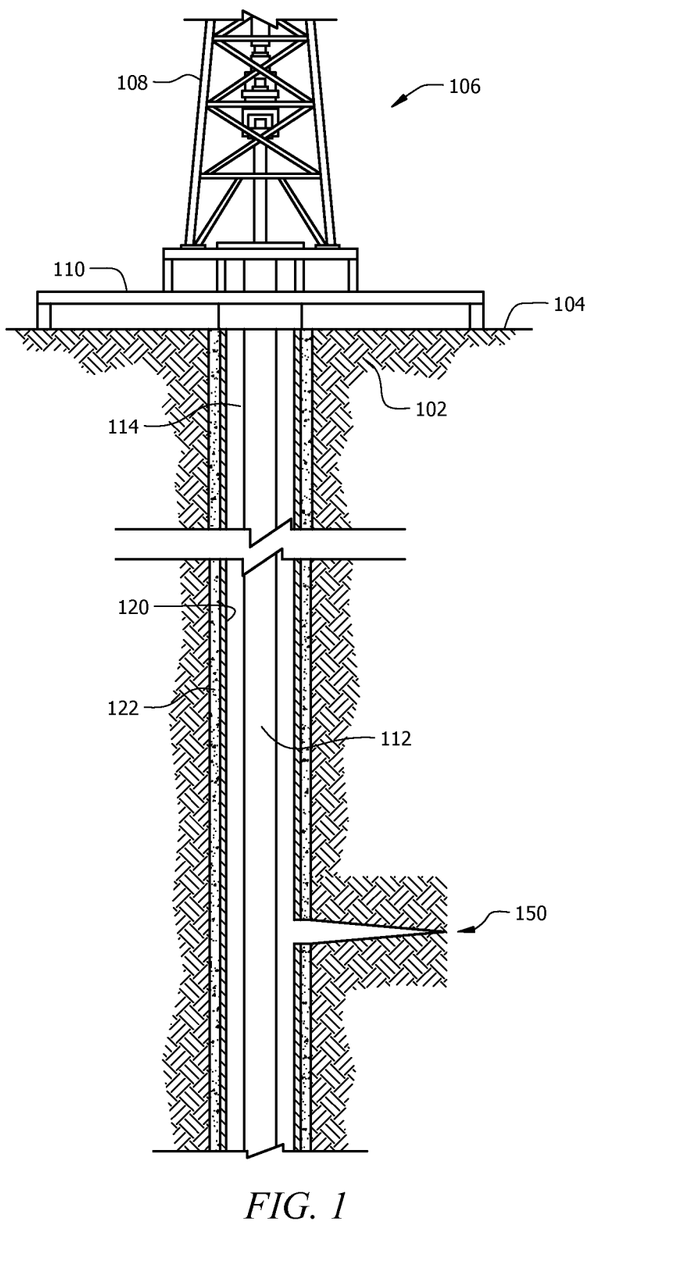
FIG. 1 is an illustration of a wellbore penetrating a subterranean formation and a lost circulation zone (LCZ) extending into the formation.

FIG. 1 depicts an exemplary operating environment of an embodiment of the compositions, systems, and methods disclosed herein. It is noted that although some of the figures may exemplify horizontal or vertical wellbores, the principles of the foregoing process, methods, and systems are equally applicable to horizontal and vertical conventional wellbore configurations. The horizontal or vertical nature of any figure is not to be construed as limiting the wellbore to any particular configuration. As depicted, the operating environment comprises a drilling rig 106 that is positioned on the earth's surface 104 and extends over and around a wellbore 114 that penetrates a subterranean formation 102 for the purpose of recovering hydrocarbons. The wellbore 114 may be drilled into the subterranean formation 102 using any suitable drilling technique. In an embodiment, the drilling rig 106 comprises a derrick 108 with a rig floor 110 through which a work string 112 extends downward from the drilling rig 106 into the wellbore 114. In an embodiment, the work string 112 delivers a wellbore servicing apparatus or some part thereof to a predetermined depth within the wellbore 114 to perform a wellbore servicing operation.

The wellbore 114 may extend substantially vertically away from the earth's surface 104 over a vertical wellbore portion, or may deviate at any angle from the earth's surface 104 over a deviated or horizontal wellbore portion. In alternative operating environments, portions or substantially all of the wellbore 114 may be vertical, deviated, horizontal, and/or curved. In some instances, at least a portion of the wellbore 114 may be lined with a casing 120 that is secured into position against the formation 102 in a conventional manner using cement 122. In alternative operating environments, the wellbore 114 may be partially cased and cemented thereby resulting in a portion of the wellbore 114 being uncased.

During any one or more of wellbore drilling, completion, or servicing operations, an LCZ 150 as described herein may be encountered. Where an LCZ 150 is encountered, it may be desirable to employ the compositions, systems, and/or methods disclosed herein to prevent, lessen, minimize, or cease the loss of fluids to the LCZ 150. In an embodiment, the compositions, systems, and methods disclosed herein comprise the placement of one or more LCCCs within an LCZ 150. The placement of an LCCC within an LCZ may be an effective means of plugging or sealing off the LCZ 150 and thereby preventing, ceasing or substantially lessening the loss of fluids to such an LCZ 150.

The LCCCs disclosed herein may comprise a base fluid, a gellable material, and optionally a thixotropic viscosifier. In some embodiments, the LCCC further comprises a bridging material. Such LCCCs may be employed to combat lost-circulation. The LCCC disclosed herein may be further characterized as forming a non-flowable, elastic, and/or plugging gel comprising a three-dimensional network based on new covalent bond formation among the reactant molecules. The LCCC may be designed to prevent the premature loss of fluids deep into the formation away from LCZ prior to formation of a plugging mass.

In an embodiment, the LCCC has a density in the range of from about 0.5 g/cc to about 4.0 g/cc, alternatively from about 0.8 g/cc to about 3 g/cc, alternatively from about 1.0 g/cc to about 2.5 g/cc. The density may be measured by any suitable methodology. For example, the density may be measured using a pressurized fluid density balance in accordance with the American Petroleum Institute (API) method found in API Recommended Practice 10B, Section 6.

In an embodiment, the LCCC comprises a base fluid, for example, an aqueous base fluid, alternatively, a substantially aqueous base fluid, as will be described herein in greater detail. In an embodiment, a substantially aqueous base fluid comprises less than about 50% of a nonaqueous component, alternatively less than about 45%, 40%, 35%, 30%, 25%, 20%, 15%, 10%, 5%, 4%, 3%, 2% or 1% of a nonaqueous component. In an embodiment, the base fluid may further comprise an inorganic monovalent salt, multivalent salt, or both. Nonlimiting examples of salts suitable for use in such a base fluid include water soluble chloride, bromide and carbonate, hydroxide and formate salts of alkali and alkaline earth metals, zinc bromide, and combinations thereof. The salt or salts in the base fluid may be present in an amount ranging from greater than about 0% by weight to a saturated salt solution.

In an embodiment, a composition comprising the base fluid of the type described herein may have a yield stress of from about 40 Pascals to about 40,000 Pascals, alternatively from about 70 Pascals to about 15,000 Pascals, alternatively from about 100 Pascals to about 12,000 Pascals. Herein yield stress refers to the force that is required on a specific area to make a material flow at a specific shear rate. It is a stress above which the shape of a material changes without a particular volume change. A greater shear stress indicates that a larger force is required to make a material flow. The yield stress is the minimum shear stress required to make a material to plastically deform. High yield stress indicates that larger forces must be applied to the same sample area to deform the sample. The yield stress may be measured by a Brookfield YR-1 Yield Stress Rheometer.

In an embodiment, the amount of base fluid present in the LCCC may be in a range of from about 50 to about 95 percent by weight (wt. %) of the LCCC, alternatively, from about 70 wt. % to about 90 wt. %, alternatively, from about 70 wt. % to about 85 wt. %.

In an embodiment, the LCCC comprises an optional thixotropic viscosifier composition. The term "thixotropic viscosifier" herein refers to a material which, when contacted with the base fluid imparts a yield stress to the resulting mixture. Additionally, a thixotropic material refers to a material that displays or imparts on the fluid to which it is added (for example, the base fluid) a decrease in viscosity over time at a constant shear rate. For example, the thixotropic viscosifier may impart a thixotropic or substantially thixotropic behavior to the base fluid. The thixotropic viscosifier may comprise a shear-thinning or substantially shear-thinning material or an additive that will impart a shear-thinning (e.g., pseudoplastic) or substantially shear-thinning behavior to the fluid to which it is added. A shear-thinning material shall mean a material which displays or imparts on the fluid to which it is added (for example, the base fluid) a decrease in viscosity at an increasing shear rate. In either such embodiment, the thixotropic viscosifier, when contacted with the base fluid, will result in a composition which exhibits a decrease in viscosity upon the application of a shear force and an increase in viscosity as the shear force ceases to be applied (e.g., zero shear viscosity). Such a shearing force may be applied to the composition (e.g., base fluid and thixotropic viscosifier) by pumping an LCCC comprising a thixotropic viscosifier through wellbore servicing equipment, into a wellbore, and eventually into an LCZ 150. Without seeking to be bound by any particular theory, pumping the LCCC containing such a thixotropic viscosifier through the wellbore servicing equipment applies a sufficient shearing force to the thixotropic viscosifier to decrease the viscosity of the LCCC and allow the LCCC to flow though the wellbore servicing equipment, into the wellbore, and into the LCZ 150. In an embodiment, the thixotropic viscosifier comprises materials which may also act as a component of the gellable system. Alternatively, the thixotropic viscosifier may comprise a stand-alone additive. In an embodiment where the gellable composition does not have a yield stress and has an adjustable gel time that is longer than the time required to place the LCCC in LCZ, the gellable composition may be used in combination with a thixotropic viscosifier composition. For example, inclusion of one or more bridging particulates within the LCCC may necessitate use of a thixotropic viscosifier.

In an embodiment, thixotropic viscosifier may be present in the LCCC in a range of from about 0.1% to about 20% by weight of the base fluid, alternatively, from about 0.3 to about 15%, alternatively, from about 0.5 to about 10%.

In an embodiment, a base fluid containing the thixotropic viscosifier has a zero shear viscosity of from about 100 cp to about 2,000,000 cp, alternatively from about 500 to about 1,000,000 cp, alternatively from about 1200 cp to about 500,000 cp when the concentration of the thixotropic viscosifier in the base fluid is in the above mentioned concentration ranges. Viscosity is a measure of the resistance of a material to flow. A material with a high flow resistance displays a high viscosity. For Newtonian fluids, the shear viscosity, usually represented by μ, is independent of the shear rate. For non-Newtonian fluids, the non-Newtonian viscosity, η, is dependent on the shear rate.

In an embodiment, a composition comprising a base fluid and thixotropic viscosifier both of the type described herein may have a shear stress history response ranging from about 1000 to about 10 million, alternatively from about 5,000 to about 500,000, alternatively from about 10,000 to about 100,000. The properties of a material may be dependent on its shear stress history, including the magnitudes and duration of the exposure of the material to shear stresses. The shear stress history may be measured by integrating the volume average shear rate (VASR) versus time history, in which the VASR is measured in units of per sec, while the time is in seconds. This method is described in an article by Walters et. al. entitled "Kinetic Rheology of Hydraulic Fracturing Fluids" presented at the 2001 Society of Petroleum Engineers Annual Technical Conference, presentation SPE 71660, and incorporated by reference in its entirety.

In an embodiment, the chemical composition of the thixotropic viscosifier may vary provided that the composition has an operable combination of the various fluid properties described previously herein. In various embodiments, the thixotropic viscosifier may have a chemical composition comprising a physically cross-linked polymer system, for example associative polymer thickeners; a mineral-based solid suspension such as a clay, for example bentonite, in water; an emulsion, for example an alkali swellable aqueous latex; a naturally produced material such bacterial or plant based gums; or any fluid containing a material or a combination of materials that provides the beneficial rheological properties described herein. In an embodiment the thixotropic viscosifier comprises a synthetic hectorite clay. In some embodiments, the synthetic hectorite clays further comprise inorganic polyphosphate peptizers.

The thixotropic viscosifier may provide stable viscosity to an LCCC when at rest as well as thixotropic properties whereby the viscosity of the LCCC is reduced during pumping but returns (e.g., the viscosity recovers) when the LCCC is static. The thixotropic viscosifier may be in the form of free-flowing powders, which are easily dispersed in water. Also, the thixotropic viscosifier may be fine-grained with an average particle size of less than one micron. A nonlimiting example of a suitable thixotropic viscosifier is a synthetic hectorite clay, commercially available from Halliburton Energy Services, Inc. as THERMA-VIS.

In an embodiment, the thixotropic viscosifier comprises a synthetic hectorite clay comprising silicon dioxide ($SiO_2$), magnesium oxide (MgO), lithium oxide ($Li_2O$), and sodium oxide ($Na_2O$). In such an embodiment, the $SiO_2$ may by present in a range from about 50% to about 70% by weight of the thixotropic viscosifier on a dry basis, alternatively, about 59.5%, the MgO may by present in a range from about 20% to about 35% by weight of the thixotropic viscosifier on a dry basis, alternatively, about 27.5%, the $Li_2O$ may by present in a range from about 0.1% to about 2.0% by weight of the thixotropic viscosifier on a dry basis, alternatively, about 0.8%, and the $Na_2O$ may by present in a range from about 1% to about 5% by weight of the thixotropic viscosifier on a dry basis, alternatively, about 2.8%.

In another embodiment, a synthetic hectorite clay may comprise $SiO_2$, MgO, $Li_2O$, $Na_2O$ and phosphorus pentoxide ($P_2O_5$). In such an embodiment, the $SiO_2$ may by present in a range from about 45% to about 65% by weight of the on a dry basis, alternatively, about 54.5%, the MgO may by present in a range from about 21% to about 31% by weight of the hectorite on a dry basis, alternatively, about 26.0%, the $Li_2O$ may by present in a range from about 0.1% to about 2.0% by weight of the hectorite on a dry basis, alternatively, about 0.8%, the $Na_2O$ may by present in a range from about 1% to about 10% by weight of the hectorite on a dry basis, alternatively, about 5.6%, and the $P_2O_5$ may by present in a range from about 1% to about 10% by weight of the on a dry basis, alternatively, about 4.1%.

In still another embodiment, the $SiO_2$ may be present in an amount of about 54.5% by weight of the synthetic hectorite on a dry basis, the MgO may be present in an amount of about 26.0% by weight of the synthetic hectorite on a dry basis, the $Li_2O$ may by in an amount of about 0.8% by weight of the synthetic hectorite on a dry basis, the $Na_2O$ may by present in and amount of about 5.6% by weight of the synthetic hectorite on a dry basis, and the $P_2O_5$ may by present in an amount of about 4.1% by weight of the synthetic hectorite on a dry basis.

In an embodiment, the thixotropic viscosifier further comprises a layered silicate clay. A nonlimiting, example of a suitable layered silicate clay includes a synthetic, inorganic colloid commercially available as LAPONITE from Rockwood Additives/Southern Clay Products, Inc, in Gonzales, Tex. Additional disclosure on gellable compositions comprising a thixotropic viscosifier may be found in U.S. Pat. No. 6,823,939 which is incorporated herein by reference in its entirety.

In an embodiment the layered silicate clay may be present in the thixotropic viscosifier in a range from about 20% to about 100% based on the dry weight of thixotropic viscosifier, alternatively, from about 40% to about 80%, alternatively, from about 50% to about 75%.

In an embodiment, the thixotropic viscosifier may comprise associative polymer thickeners. Associative polymer thickeners are polymers which are hydrophobically modified with alkyl groups of 2-22 carbon chain length, and will impart viscosity to a fluid in which those polymers are dissolved especially at low shear rates or in static fluids. Not seeking to be bound by theory, the viscosity build up may be due to the intermolecular hydrophobic association among the hydrophobic groups of different individual polymers. Such hydrophobic associations are shear sensitive, which means they break reversibly upon shearing, and reform upon reduction in shear rates. The associative links may serve as transient, physical cross-links, thereby increasing the viscosity of and imparting yield stress to the fluid. In an embodiment, the thixotropic viscosifier may further comprise a salt. Such a salt may increase the associative interactions, thereby further increasing fluid viscosities. Such associative polymers may be nonionic, anionic, cationic or zwitterionic. A nonlimiting example of suitable associative polymers include hydrophobically modified polyethyleneoxide polymers, commercially available as OPTIFLO® from Rockwood Additives/Southern Clay Products, Inc., in Gonzales, Tex.

In an embodiment, the thixotropic viscosifier may comprise a cellulose-based polymer. Such cellulose-based polymers may be pseudoplastic. In an embodiment, such cellulose-based polymers may be hydrophobically modified to provide associative interactions among polymer chains when dissolved in a fluid. Nonlimiting examples of suitable cellulose-based polymers include cellulose ethers, methylcellulose, and hypromellose products commercially available as METHOCEL from Dow Chemical Company in Midland, Mich. Further nonlimiting examples of suitable cellulose-based polymers include ethylhydroxyethylcellulose, methylhydroxyethylcellulose, hydroxypropylcellulose, and hydroxypropylcellulose. Using such water soluble associative polymers, solids free fluids of the present disclosure can be designed for application when solids free fluids are needed, for example in loss circulation zones of depleted formations with high permeabilities.

In an embodiment, the thixotropic viscosifier comprises a polysaccharide. Suitable such polysaccharides include without limitation those that when dissolved in an aqueous solution exhibit a yield stress. Not seeking to be bound by theory, the yield stress may be the result of the rigid polymer chain structure of such saccharides. Nonlimiting examples of such polysaccharides include bacterial and plant based gums, for example, xanthan, diutan, gellan, gum tragacanth and pestan.

In an embodiment, the thixotropic viscosifier may comprise a thixotropic silica. An example of thixotropic silica is amorphous, pyrogenic silica. The thixotropic silica particles may be characterized as having a diameter of less than about 100 nm diameters, alternately, less than about 50 nanometers, alternately, less than about 40 nm.

Not seeking to be bound by any particular theory, the presence of a small amount of salt in the base fluid (about 0.5% to about 5% by weight of the base fluid) may enable the thixotropic viscosifier (e.g., a synthetic hectorite clay or a hydrophobically modified polymer) to form a gel in an aqueous liquid and better impart thixotropic properties thereto.

In an embodiment, the LCCC comprises a gellable composition. A gellable composition suitable for use in this disclosure may form a highly rubbery and elastic gel upon placement in or after entering the lost circulation zone and be characterized by an adjustable gel time ranging from nearly instantaneous to a few hours. In an embodiment, the gellable composition comprises a fluid with no yield stress prior to gelling. In an embodiment, one or more components of the gellable composition may contribute a thixotropic characteristic to LCCC. In an embodiment, the gellable composition may have a gel time shorter than the time required to place the LCCC in LCZ. When such composition is used, the components of the gellable composition may be pumped separately and mixed in or near the LCZ. Such compositions may exhibit gel times of from about $1/1000$ to about $1/2$ of the LCCC placement time, alternately of from about $1/100$ to about $1/10$ of the placement time may or may not have yield stress, may exhibit low viscosities and may or may not comprise a thixotropic viscosifier. Any gellable composition compatible with the other components of the LCCC may be utilized. For example, the gellable composition may comprise 1) a water-soluble polymerizable monomer with olefinic unsaturation; 2) a cross-linkable, water soluble polymer; 3) a water-compatible, curable monomer/macromer system containing no olefinic unsaturation and capable of forming a cured thermoset polymer; or 4) an inorganic, water soluble gel forming composition, and one or more reagents or chemicals necessary to convert these materials into gelled compositions. Such materials may include, a cross-linking multi-functional monomer, a polymerization initiator, a cross-linking agent, a curing agent, a gel time moderating agent, a cure activator, or combinations thereof depending on the cross-linkable materials selected.

In an embodiment, the amount of gellable composition present in the LCCC may be in a range from about 0.2 wt. % to about 30 wt. % by weight of the LCCC, alternatively, from about 0.5 wt. % to about 20 wt. %, alternatively, from about 1 wt. % to about 15 wt. %.

In an embodiment, the gellable composition comprises a dilute solution of monomeric acrylates of alkaline earth metals and water, hereinafter termed a low viscosity gel system (LVGS). The LVGS may comprise cross-linkable water soluble polymerizable monomeric acrylates of alkaline earth metals, a multifunctional unsaturated cross-linking monomer, a redox polymerization initiator, a polymerization rate moderator, and, optionally, a redox polymerization rate retarder or a free radical initiator. The cross-linkable monomeric acrylates may be present in the LVGS in an amount from about 1 wt. % to about 30 wt. %, alternatively, about 5 wt. % to about 20 wt. % alternatively about 10 wt. % to about 15 wt. % based on weight of base fluid used in the LCCC; and the redox polymerization initiator may be present in an amount from about 3 wt. % to about 30 wt. %, alternatively, about 5 wt. % to about 20 wt. %, alternatively about 10 wt. % to about 15 wt. % by weight of acrylate salt. The redox polymerization rate moderator may be present in an amount from about 3 wt. % to about 25 wt. %, alternatively, about 5 wt. % to about 20 wt. %, alternatively about 10 wt. % to about 15 wt. % by weight of the acrylate salt. The polymerization rate retarder may be present in an amount from about 0.01 wt. % to about 2 wt. %, alternatively, about 0.05 wt. % to about 1 wt. %, alternatively about 0.1 wt. % to about 0.5 wt. % based on the acrylate salt. The free radical initiator, may be present in an amount from about 0.1 wt. % to about 5 wt. %, alternatively, about 0.5 wt. % to about 3 wt. %, alternatively about 1 wt. % to about 2 wt. % by weight of the acrylate salt.

Non-limiting examples of a water soluble, polymerizable monomeric acrylates suitable for use in the LVGS include calcium and magnesium salts of acrylic acid, salts of methacrylic acid, and combinations thereof. Non-limiting examples of redox initiators suitable for use in the LVGS include sodium persulfate ($Na_2S_2O_8$), ammonium persulfate, sodium percarbonate ($Na_2CO_3$), sodium perborate ($NaBO_3$), and combinations thereof. A non-limiting example of a polymerization rate moderator suitable for use in combination with a redox initiator include monomeric (e.g., morpholine), oligomeric (e.g., tetramethylethylenediamine) or polymeric amines (polyethyelenimine), alkanolamines (e.g., triethanolamine), ammonium salts (e.g., ammonium carbonate). Non-limiting examples of free radical initiators suitable for use in the LVGS include azo-initiators, peroxoide and hydroperoxides. Cross-linking multifunctional monomers suitable for use in combination with the LVGS composition include without limitation ethylene bisacrylamide, methylene bisacrylamide, trimethylol propane triacrylate, trimethylol propylene diacrylate, ethyleneglycol triacrylate, pentaerythrytol triacrylate, pentaerythrytol diacrylate, triallylcyanurate and mixtures thereof. The amount of the cross-linking monomer may range from about 0.01 wt. % to about 5 wt. %, alternately, from about 0.1 wt. % to about 2 wt. % by weight of the polymerizable monomers. In an embodiment, the cross-linkable monomeric acrylates are activated by a mixture comprising a redox initiator, and a polymerization rate moderator. Upon activation, the cross-linkable composition begins to form a gel. Adjusting the ratio of polymerization rate moderator to redox initiator will vary the gel time achieved upon activation. In an embodiment, the ratio of polymerization rate moderator to redox initiator to polymerization moderator is in a range from about 1 to 10 to about 10 to 1, alternatively, the ratio is about 1 to 1 by weight. Alternately, the redox initiator may be encapsulated, and used with or without a polymerization rate modifier. Examples of encapsulated redox initiators are OPTIFLO II and OPTIFLO III which are commercially from Halliburton Energy Services, Inc. A nonlimiting example of polymerization rate retarder is potassium ferricyanide.

While redox types of initiators are suitable for gellation at low temperatures, gellation at high temperatures can be achieved by using free radical initiators which have free-radical generating decomposition temperatures in the desired range. Such initiators include water soluble or water dispersible azo initiators and organic peroxides and hydroperoxides. Examples of suitable azo initiators include 2,2'-azobis(2-(2-imidazolin-2-yl)propane) dihydrochloride and 2,2'-azobis(2-methyl-N-2-hydroxyethyl)propionamide. Suitable water soluble azo initiators are available commercially from Wako Chemicals USA, Inc, Richmond, Va. and from Halliburton Energy Services, Inc. under the trade name PERM C and PERM D. Nonlimiting examples of suitable organic peroxides and hydroperoxides include benzoyl peroxide and tert-butyl hydroperoxide.

In an alternative embodiment, the gellable composition comprises crosslinkable materials comprising self-crosslinking materials and a catalyst. In some embodiments, the density of the LVGS solution may be adjusted by using an aqueous salt solution (e.g., a brine) as a carrier fluid or by the addition of suitable salts in desired amounts. Examples of brines suitable for use in the LVGS include without limitation zinc bromide, calcium chloride, sodium chloride, potassium chloride and combinations thereof. In an embodiment, the brine comprises zinc bromide. The brine may have a density in the range of from about 9 to about 19 pounds per gallon and may function to modulate the density of the composition. Further description of LVGS type suitable for use in this disclosure can be found in U.S. Pat. Nos. 5,358,051; 6,936,574; 6,187,839 and 5,335,726, each of which is incorporated by reference herein in its entirety.

In an embodiment, the LCCC includes a gel system comprising one or more crosslinkable polymers and a crosslinking agent, hereinafter termed a crosslinkable material gel system (CMGS-1). The crosslinkable polymeric material may be present in the CMGS-1 an amount from about 0.3% to about 10%, alternatively, about 0.5 to 5% by weight of the CMGS-1; and the crosslinking agent may be present in an amount from about 0.01% to about 5%, alternatively, about 0.05% by weight of the CMGS-1.

Examples of crosslinkable polymeric materials suitable for use in the CMGS-1 include, but are not limited to a water-soluble copolymer of a non-acidic ethylenically unsaturated polar monomer and an ethylenically unsaturated ester monomer; a terpolymer or tetrapolymer of a non-acidic ethylenically unsaturated polar monomer, an ethylenically unsaturated ester monomer, and at least one monomer selected from alkali, alkaline earth or ammonium salts of 2-acrylamido-2-methylpropane sulfonic acid, acrylic acid, or both; or combinations thereof. The copolymer may contain from one to three polar monomers and from one to three unsaturated esters.

The ethylenically unsaturated ester monomers used in the crosslinkable material may be formed from a hydroxyl compound and an ethylenically unsaturated carboxylic acid selected from the group consisting of acrylic, methacrylic, crotonic, and cinnamic acids. The ethylenically unsaturated group may be in the alpha-beta or beta-gamma position relative to the carboxyl group, but it may be at a further distance. In an embodiment, the hydroxyl compound is an alcohol generally represented by the formula ROH, wherein R is an alkyl, alkenyl, cycloalkyl, aryl, arylalkyl, aromatic, or heterocyclic group that may be substituted with one or more of a hydroxyl, ether, or thioether group. The substituent can be on the same carbon atom of the R group as is bonded to the hydroxyl group in the hydroxyl compound. The hydroxyl compound may be a primary, secondary, iso, or tertiary compound. In an embodiment, a tertiary carbon atom is bonded to the hydroxyl group, e.g., t-butyl and trityl. In an embodiment, the ethylenically unsaturated ester is t-butyl acrylate.

The non-acidic ethylenically unsaturated polar monomers used in the crosslinkable material can be amides (e.g., primary, secondary, and/or tertiary amides) of an unsaturated carboxylic acid. Alternately, the amide group may be part of a cyclic structure. The amide may be derived from ammonia, or a primary or secondary alkylamine, which may be optionally substituted by at least one hydroxyl group as in alkanolacrylamides such as N-ethylolacrylethamides or N-methylolacrylamides. Examples of such carboxylic derived ethylenically unsaturated polar monomers are acrylamide, methacrylamide, N-vinylpyrrolidone, and acrylic ethanol amide.

A crosslinking agent is herein defined as a material that is capable of crosslinking polymers to form a gel. Non-limiting examples of a crosslinking agent which may be suitably employed in the CMGS-1 include an organic crosslinking agent such as a polyalkyleneimine, a polyfunctional aliphatic amine such as polyalkylenepolyamine, an aralkylpolyamine, a heteroaralkylpolyamine, or combinations thereof. Examples of suitable polyalkyleneimines are polymerized ethyleneimine and propyleneimine. Examples of suitable polyalkylenepolyamines are polyethylene- and polypropylene-polyamines. A description of such polymers and crosslinking agents can be found in U.S. Pat. Nos. 5,836,392, 6,192,986, and 6,196,317, each of which is incorporated by reference herein in its entirety. Other examples of crosslinking agents include transition metal based cross-linking agents. Examples of such cross-linking agents include chromium (III) compounds, titanic and zirconium complexes of organic ligands.

In an embodiment, the crosslinkable polymer system is a copolymer of acrylamide and t-butyl acrylate, and the crosslinking agent is polyethylenimine. These materials are commercially available as the H2ZERO® system from Halliburton Energy Services, Inc. The H2ZERO® system is a combination of HZ-10 polymer and HZ-20 crosslinker. HZ-10 is a poly(acrylamide-co-acrylate ester) copolymer. HZ-20 polymer is a polyethylenimine crosslinker. The gelation rate of the H2ZERO® system is controlled by controlling the ratio of HZ-10 to HZ-20 or by the addition of cross-linking rate modifiers. Suitable crosslinker rate modifiers are disclosed in U.S. Pat. No. 7,287,587, which is incorporated herein in its entirety. Thus, the concentrations of both HZ-10 polymer and HZ-20 crosslinker contribute to the gel system reaction time, its final mechanical properties and stability. In an embodiment, the crosslinkable polymer system forms a viscous gel in from about 60 mins to about 300 mins, alternatively in from about 120 mins to about 240 mins at a temperature of from about 180° F. to about 320° F., alternatively from about 180° F. to about 225° F. and, alternatively from about 250° F. to about 320° F.

In an embodiment of the LCCC comprises a CMGS-1 which comprises a crosslinkable material present in an amount of from about 1 wt. % to about 8 wt. % by weight of the LCCC, alternatively from about 1 wt. % to about 5 wt. %, alternatively from about 2 wt. % to about 4 wt. %; and a crosslinking agent present in an amount of from about 0.1 wt. % to about 5 wt. % by weight of the LCCC, alternatively from about 0.3 wt. % to about 2 wt. %, alternatively from about 0.5 wt. % to about 1 wt. %.

In an embodiment, the gel system comprises water, a cross-linking agent, and a water-soluble polymer or mixture of polymers. Alternatively, the gel system comprises water, an oxidized chitosan-based compound, and a water-soluble compound having carbonyl groups. Alternatively, the gel system comprises water, an amine-based polymer, a polysaccharide-based polymer, and an oxidizing agent that is capable of at least partially oxidizing the polysaccharide-based polymer. Alternatively, the gel system comprises a water-soluble polymer having acylated amine units that act as a cross-linker and a crosslinkable water-soluble polymer that comprises a functional group selected from the group consisting of carboxylic acids and carboxylic acid derivatives. Alternatively, the gel system comprises water; a water-soluble polymer comprising polymerized vinyl amine units; and an organic compound capable of crosslinking with the vinyl amine units of the water-soluble polymer. Alternatively, the gel system comprises an acrylamide polymer and a crosslinking agent. Further descriptions of such gel systems can be found in U.S. Pat. Nos. 6,176,345; 6,607,305; 6,843,841; 6,764,981; 6,321,841; 6,192,986; 5,836,392; 6,176,315; 7,331,390; 7,128,148; 4,629,747; and 4,683,949 each of which is incorporated herein by reference in its entirety.

In an embodiment, the gel system comprises a water-compatible, thermoset polymer-forming monomer/macromer system containing no olefinic unsaturation, referred to herein as a resin-based gel system. As used herein, the term "water compatible" means water soluble, water dilutable, or water dispersible and that the presence of water does not detrimentally affect the curing reactions. In an embodiment, the resin-based gel system comprises a resin formed from a formaldehyde condensation reaction with an amino resin or a furan resin, a curing agent for causing the LCCC to cure, a coupling agent for bonding the LCCC in a subterranean zone, and, optionally, a diluent. Examples of amino resin/formaldehyde condensation resins include urea-formaldehyde resins, melamine-formaldehyde resins. Examples of furan/formaldehyde resins include furfuryl alcohol/formaldehyde condensation resins. In an embodiment, the amino resin/formaldehyde resins and furfuryl alcohol/formaldehyde resins may be partially prepolymerized while retaining water compatibility. Preparation of water soluble furfuryl alcohol/formaldehyde resins is described in U.S. Pat. No. 5,486,557, and is incorporated herein in its entirety. Examples of water compatible resins derived from amino resin/formaldehyde condensation are described in U.S. Pat. No. 6,881,708. The resin may be present in the gelling composition in an amount of from about 5% to about 40%, alternatively, about 10 to about 30%, alternatively about 15 to about 25% by weight of the water-compatible, thermoset polymer forming monomer/macromer gel system; the curing agent may be present in an amount from about 1% to about 10%, alternatively, about 2% to about 8%, alternatively about 3% to about 5% by weight of the resin; the coupling agent may be present in an amount from about 0.1% to about 5%, alternatively, about 1% to about 4%, alternatively about 2% to about 4% by weight of the resin; the diluent may be present in an amount from about 0% to about 25%, alternatively, about 5% to about 20%, alternatively about 10% to about 15% by weight of the resin.

The resin-based gel system may comprise polymerized furfuryl alcohol/aldehyde (i.e., furan-formaldehyde polymer) and non-polymerized (i.e., unreacted) furfuryl alcohol/aldehyde. The weight ratio of polymerized furfuryl alcohol/aldehyde to non-polymerized or unreacted furfuryl alcohol/aldehyde in the LCCC may be chosen such that dilution with an aqueous fluid does not cause phase separation of the resin and aqueous fluid, as may be determined experimentally for resins with varying degrees of polymerization.

As mentioned above, the resin-based gelling system may comprise a curing agent, also known as a catalyst. A curing agent is herein defined as a material having the ability to cause the resin to cure after a latent period to a hard, resilient solid. As used herein, curing refers to polymerizing the non-polymerized resin fraction, as well as further polymerization of previously polymerized resin fraction, thereby forming a crosslinked network of polymer chains. Curing agents suitable for curing the partially polymerized furfuryl alcohol/aldehyde at temperatures above about 200° F. include, but are not limited to, organic and inorganic acid anhydrides, ammonium salts, sodium bisulfate, hydrolyzable esters such as butyl acetate, furfuryl acetate, organic acids such as maleic acid, fumaric acid, para-toluene sulfonic acid, inorganic acids such as phosphoric or sulfonic acid, and combinations thereof. In an embodiment, the curing agent comprises an organic acid; alternatively the curing agent comprises sodium bisulfate.

The resin system may also comprise a coupling agent, which is defined as a material having the ability to bond (i.e., adhere) the LCCC (containing the resin composition) to solid surfaces, such as the surfaces of a metal pipe and of a subterranean well bore and/or the surfaces within an LCZ or flowpath, when the LCCCs are in a static state (e.g., when the composition is setting). Examples of suitable coupling agents include, but are not limited to, silanes having functional groups that give the silanes the ability to bond with solid surfaces. Examples of such silanes are acrylate functionalized silanes, amine functionalized silanes, and vinyl functionalized silanes. Specific examples of silane coupling agents that can be utilized in the LCCC include, but are not limited to, N-2-(aminoethyl)-3-aminopropyltrimethoxysilane, 3-glycidoxypropyltrimethoxysilane, and N-beta-(aminoethyl)-gamma-aminopropyl trimethoxysilane, gamma-aminopropyltriethoxysilane, or combinations thereof. In an embodiment, the coupling agent comprises N-beta-(aminoethyl)-gamma-aminopropyl trimethoxysilane.

A liquid diluent may also be present in the resin system to increase the flexibility and reduce the brittleness of the cured thermoset polymer. Due to the presence of the diluent in the resin system, the degree of curing may be relatively reduced. The less expensive diluent thus reduces the overall cost of the LCCC. A diluent suitable for use in this disclosure may decrease the viscosity of the LCCC, ensuring that the compositions can be pumped into a well bore. Further, the diluent may reduce the brittleness of the LCCC, meaning that it reduces the tendency of the compositions to crack or flake when bent, flexed, or scratched. The diluent may also act as a heat sink for the exothermic reaction that occurs as the non-polymerized resin in the resin system is cured. Examples of diluents for use in this disclosure include, but are not limited to, alky acetates such as butyl acetate and furfuryl acetate, 2-butoxy ethanol, and combinations thereof. In an embodiment the diluent comprises, butyl acetate, alternatively furfuryl acetate.

The resin system can also comprise a ductility imparting agent. A ductility imparting agent is herein defined as a material having the ability to increase the ductility of the cured LCCC (comprising a curable resin system), wherein ductility refers to the ability of a material to stretch under the application of tensile load and retain the deformed shape on the removal of the load. Examples of suitable ductility imparting agents include, but are not limited to, phthalate materials, i.e., organic liquids that cause the curable resin to crosslink less tightly than normal. Examples of phthalate materials include alkyl phthalates such as diethyl phthalate, butyl benzyl phthalate, and di-(2-ethylhexyl) phthalate, or combinations thereof. In an embodiment, the ductility imparting agent comprises diethyl phthalate.

The resin system can be cured at temperatures of from about 80° F. to above about 200° F., i.e., typical temperatures in a well bore. The cure time of the resin at such temperatures is in the range of from about 6 to about 96 hours, allowing it to be placed into a wellbore without being concerned that it will harden before it reaches its intended location. In addition, the resin system forms a thermoset resin and thus cannot be re-softened despite being exposed to relatively high temperatures such as those experienced in a well bore. The polymerized resin system is substantially resistant to degradation by chemicals.

In an alternative embodiment, the gel system comprises a pumpable, corrosion resistant, water compatible hardenable epoxy sealing composition. Additional disclosure regarding epoxy based-type systems may be found in U.S. Pat. Nos. 6,951,250 and 6,321,841, each of which is incorporated by reference herein in its entirety.

In an embodiment, the gel system comprises a water-soluble salt and an activator, hereinafter termed a water-soluble salt gel system (WSGS). The water-soluble salt may be present in the WSGS in an amount from about 2% to about 25%, alternatively, about 5 to about 20%, alternatively about 8 to about 15% by weight of the WSGS and the activator may be present in an amount from about 0.5% to about 25%, alternatively about 1% to about 15%, alternatively about 5% to about 10% by weight of the WSGS.

Examples of water-soluble salts suitable for use in a WSGS include without limitation an alkali metal metasilicate compound, an alkali metal silicate compound, an alkali metal aluminate, or combinations thereof. In an embodiment, the water-soluble salt comprises sodium silicate, potassium silicate, sodium aluminate, or combinations thereof, alternatively sodium silicate. Examples of activators suitable for use in this disclosure include without limitation, ethyl acetate, urea, sugar, sodium acid pyrophosphate, chloride, acetate and nitrate salts of alkali and alkaline earth metals, or combinations thereof.

Not seeking to be bound by any particular theory, reaction of the activator and the water-soluble salt, for example sodium silicate, may form an insoluble silica gel or metal silicate matrix. Additional disclosure on WSGS may be found in U.S. Pat. Publication No 2006/0086501A1 which is incorporated herein by reference in its entirety.

In an embodiment, the LCCC may advantageously comprise a bridging material. The bridging material may generally comprise a solid, semi-solid, or particulate material. Again, not seeking to be bound by any particular theory, the bridging material may function to fill, partially fill, bridge, or seal pores and cracks in the LCZ while the gel of the LCCC sets, thereby minimizing fluid loss to the formation until the LCCC has gelled completely. Thus, the bridging material may hold the LCCC in place while gellation occurs. Various bridging materials are set forth herein below.

In an embodiment, the bridging material comprises a filler. Herein, a filler refers to particulate material, also termed finer filler material, designed to bridge off across the packing agent of the bridging material. Such fillers may be smaller in size than the packing agent. In an embodiment, the filler has a specific gravity of less than about 0.6 to about 5, alternatively from about 1.5 to about 5, alternatively from about 1.75 to about 4. Without wishing to be limited by theory, fillers having a specific gravity in the disclosed range may produce a bridging material with greater flexibility and ductility.

Examples of suitable fillers include without limitation alkyl quaternary ammonium montmorillonite, bentonite, zeolites, barite, fly ash, calcium sulfate, hollow glass, elastomer, or ceramic beads, and combinations thereof. In an embodiment the filler is an alkyl quaternary ammonium montmorillonite. In an embodiment, the filler is a water swellable or hydratable clay. In an alternative embodiment, the filler is a sealing composition comprising a hydratable polymer, an organophilic clay and a water swellable clay suspended in a non-aqueous carrier fluid such as mineral oil or kerosene, and contacted with the LCCC in or near LCZ. Such oil-based sealing compositions are disclosed in U.S. Pat. Nos. 5,913,364; 6,167,967; 6,258,757, and 6,762,156, each of which is incorporated by reference herein in its entirety. In an embodiment, the filler material is FLEX-PLUG sealant, which is a deformable, viscous, cohesive oil-based composition comprising alkyl quaternary ammonium montmorillonite commercially available from Halliburton Energy Services, Inc.

In an embodiment, the bridging material comprises a packing agent. Nonlimiting examples of packing agents include without limitation resilient materials such as graphite; fibrous materials such as cedar bark, shredded cane stalks and mineral fiber; flaky materials such as mica flakes and pieces of plastic or cellophane sheeting; and granular materials such as ground and sized limestone or marble, vitrified shale, wood, nut hulls, formica, corncobs, gravel, cotton hulls, and combinations thereof. A resilient graphite material is commercially available as Duo-Squeeze H from Halliburton Energy Services, Inc. In an embodiment, the packing agent is a resilient graphite such as STEELSEAL lost circulation additives which are dual composition graphite derivatives commercially available from Baroid Industrial Drilling Products, a Halliburton Energy Services, Inc.

In another embodiment, the packing agent is a resin-coated particulate. Examples of suitable resin-coated particulates include without limitation resin-coated ground marble, resin-coated limestone, resin-coated sand, and combinations thereof. In an embodiment, the packing agent is a resin-coated sand. The sand may be graded sand that is sized based on a knowledge of the size of the lost circulation zone. The graded sand may have a particle size in the range of from about 10 to about 70 mesh, U.S. Sieve Series. The graded sand can be coated with a curable resin, a tackifying agent or mixtures thereof. The hardenable resin compositions useful for coating sand and consolidating it into a hard fluid permeable mass generally comprise a hardenable organic resin and a resin-to-sand coupling agent. Such resin compositions are well known to those skilled in the art, as is their use for consolidating sand into hard fluid permeable masses. A number of such compositions are described in detail in U.S. Pat. Nos. 4,042,032, 4,070,865, 4,829,100, 5,058,676 and 5,128,390 each of which is incorporated herein by reference in its entirety. Methods and conditions for the production and use of such resin coated particulates are disclosed in U.S. Pat. Nos. 6,755,245; 6,866,099; 6,776,236; 6,742,590; 6,446,722, and 6,427,775, each of which is incorporated herein by reference in its entirety. An example of a resin suitable for coating the particulate includes without limitation SANDWEDGE NT conductivity enhancement system that is a resin coating commercially available from Halliburton Energy Services, Inc.

In some embodiments, the bridging material is a particulate material such as cement. In embodiments, where the bridging material comprises a cement, any suitable cement known in the art may be used in the LCCC. An example of a suitable cement includes hydraulic cement, which comprises calcium, aluminum, silicon, oxygen, and/or sulfur and which sets and hardens by reaction with water. Examples of hydraulic cements include, but are not limited to a Portland cement, a pozzolan cement, a gypsum cement, a high alumina content cement, a silica cement, a high alkalinity cement, or combinations thereof. In an embodiment the hydraulic cements are Portland cements of the type described in American Petroleum Institute (API) Specification 10, 5$^{th}$ Edition, Jul. 1, 1990, which is incorporated by reference herein in its entirety. The cement may be, for example, a class A, B, C, G, or H Portland cement. Another example of a suitable cement is microfine cement, for example, MICRODUR RU microfine cement available from Dyckerhoff GmBH of Lengerich, Germany.

In an embodiment, the bridging material is a water-swellable starch. Examples of water-swellable starches suitable for use as a bridging material include without limitation cross-linked starches. In an embodiment, the bridging material is a granular starch or mixture of starches. Alternatively, the bridging material is a pre-gelatinized starch. Pre-gelatinized starches may be obtained commercially or they may be prepared by pre-gelatinization treatment. For pre-gelatinization, the chosen starch granules are heated in water to a point where the starch granules swell irreversibly. Upon cooling, this swollen structure is retained. The use of pre-gelatinized starches may be advantageous, since these materials are stable at higher temperatures in the formation, e.g., up to 300° F. Chemically modified starches are those derived from natural starches by chemical reaction of a natural starch with a suitable organic reactant. Examples of suitable chemically modified starches include, but are not limited to, carboxymethyl starch, hydroxyethyl starch, hydroxypropyl starch, acetate starch, sulfamate starch, phosphate starch, nitrogen modified starch, starch crosslinked with aldehydes, epichlorohydrin, borates, and phosphates, and starches grafted with acrylonitrile, acrylamide, acrylic acid, methacrylic acid, maleic anhydride, styrene, and combinations thereof. In an embodiment, the starch is present in the composition in an amount effective to prevent leak-off of the gel material. Effective amounts may be determined by one of ordinary skill in the art.

In an embodiment, the LCCC may further comprise one or more additives or modifying agents. Such additives may include but are in no way limited to fluid absorbing materials, resins, aqueous superabsorbers, viscosifying agents, suspending agents, dispersing agents, salts, accelerants, surfactants, retardants, defoamers, settling prevention agents, weighting materials, dispersants, vitrified shale, formation conditioning agents, or combinations thereof. Other mechanical property modifying additives, for example, are carbon fibers, glass fibers, metal fibers, minerals fibers, and the like which can be added to further modify the mechanical properties. These additives may be included singularly or in combination. Methods for introducing these additives and their effective amounts, as well as methods of incorporating these additives into the LCCC, are known to those of ordinary skill in the art.

Other particulate material may be used in the LCCC alone or in combination with a cement of the type previously described herein. The particulate material may be an inert material, and may be sized (e.g., a suitable particle size distribution) based upon the characteristics of the void space to be sealed. Examples of suitable particulate material include, but are not limited to, cement, sand, silica flour, gilsonite, graphite; fibrous materials such as cedar bark, shredded cane stalks and mineral fiber; flaky materials such as mica flakes and pieces of plastic or cellophane sheeting, ground battery casings, ground rubber tires; and granular materials such as ground and sized limestone or marble, wood, nut hulls, formica, corncobs, gravel, ground battery casings, ground rubber tires, cotton hulls, and combinations thereof.

In an embodiments, an LCCC of the type described herein without the bridging agent may be characterized by a viscosity of from about 5 centipoise to about 5000 centipoise; alternatively from about 100 centipoise to about 2000 centipoise; alternatively from about 300 centipoise to about 1.

In an embodiments, an LCCC of the type described herein may be characterized by a pump time of from about 30 min to about 48 hours; alternatively from about 2 hours to about 24 hours; alternatively from about 3 hours to about 18 hours.

In an embodiments, an LCCC of the type described herein may be characterized by a set time or gel time of from about 0 hours to about 96 hours; alternatively from about 0.5 hours to about 24 hours; alternatively from about 3 hours to about 18 hours.

In an embodiment, the LCCC may be employed as a wellbore servicing fluid. As used herein, a "servicing fluid" refers to a fluid used to drill, complete, work over, fracture, repair, or in any way prepare or restore a wellbore for the recovery of materials residing in a subterranean formation penetrated by the wellbore. Examples of servicing fluids include, but are not limited to, cement slurries, drilling fluids or muds, spacer fluids, lost circulation materials, fracturing fluids or completion fluids, all of which are well known in the art. The servicing fluid is for use in a wellbore that penetrates a subterranean formation. It is to be understood that "subterranean formation" encompasses both areas below exposed earth and areas below earth covered by water such as ocean or fresh water.

In an embodiment, the method of utilizing one or more of the LCCCs described herein may comprise introducing the LCCC into a wellbore; placing at least a portion of the LCCC within a LCZ or other flowpath through which the flow of fluids may be desirably reduced or ceased; and causing or allowing the LCCC to gel.

As noted above, in an embodiment, the LCCCs may be introduced to the wellbore to prevent the loss of aqueous or non-aqueous drilling fluids into LCZs such as voids, vugular zones, and natural or induced fractures while drilling. In an embodiment, the LCCCs may be introduced to prevent the loss or migration of fluid into lost circulation zones or undesirable flowpaths such as voids, vugular zones, and natural or induced fractures in the formation. In order to prevent settling of particulate materials during pumping a separate settling prevention agent may be included in the LCCC. Nonlimiting examples of commonly used settling prevention agents include polymeric agents such as galactomannans, modified or derivatized galactomannans, cellulose derivatives, and combinations thereof. Cross-linking agents, breakers and other additives may also be included in the LCCC.

In an embodiment, the LCCC is placed into a wellbore as a single stream and activated by downhole conditions to form a barrier that substantially seal a lost circulation zones or other undesirable flowpath. In such an embodiment, the LCCC may be placed downhole through the drill bit forming a composition that substantially eliminates the lost circulation. In yet another embodiment, the LCCC is formed downhole by the mixing of a first stream comprising one or more LCCC components and a second stream comprising additional LCCC components. For example, the LCCC may be formed downhole by the mixing of a first stream comprising a cross-linkable polymer and a second stream comprising an initiator. Methods for introducing compositions into a wellbore to seal subterranean zones are described in U.S. Pat. Nos. 5,913,364; 6,167,967; and 6,258,757, each of which is incorporated by reference herein in its entirety.

The LCCCs of this disclosure may provide lost circulation control in a sufficiently short time period to prevent the operator from pulling out of the hole and thus reducing nonproductive rig time; various methods of introducing the LCCC or components thereof, which will be described in greater detail herein below, may allow this to be accomplished. In an embodiment, the gellable composition of the LCCC may set or begin to set instantaneously or substantially instantaneously upon entering the LCZ 150. Alternatively, some amount of time may be required before the gellable composition of the LCCC sets or begins to set. The amount of time between when the LCCC is introduced to a LCZ and sets to reduce or prevent lost circulation may be adjusted by one of ordinary skill in the art with the benefits of this disclosure. In an embodiment, the LCCC may be designed to set after some amount of time. For example, the gellable composition of the LCCC may being to set within about 1 minute, alternatively, about 5 minutes, alternatively, about 10 minutes, alternatively, about 15 minutes, alternatively, about 20 minutes, alternatively, about 30 minutes, alternatively, about 40 minutes, alternatively, about 50 minutes, alternatively, about 60 minutes, or more.

In an embodiment, the LCCC may be introduced into the wellbore, the formation, or an LCZ as a single pill fluid. That is, in such an embodiment, all components of the LCCC may be mixed and introduced into the wellbore as a single composition. As will be understood by those of skill in the art with the aid of this disclosure, introduction as a single pill may be an appropriate mode of introduction where the setting of a gel can be delayed, retarded, or otherwise controlled such that the gel will not set until reaching a desired locale.

In an alternative embodiment, the LCCC may be introduced into the wellbore, the formation, or the LCZ in multiple components. As will be understood by those of ordinary skill in the art, it may be desirable or advantageous to introduce components of the LCCC separately, for example, in situations where the gellable composition of the LCCC will set within a relatively short time-frame (e.g., those gels which may set or begin to set within an amount of time less than is necessary to introduce the LCCC into the desired LCZ). Introducing two or more of the components of the LCCC separately allows the LCCC to be positioned within and LCZ prior to gelation. The separate introduction of at least two of the LCCC components may be achieved by various means, described in greater detail herein below.

In an exemplary embodiment, the benefits of separate introduction of the reactive components of the LCCC components may also be achieved by encapsulation of at least one of those components. For example, in accordance with the compositions and methods of the instant disclosure, a single stream comprising a first component (e.g., a cross-linking agent or initiator) may be encapsulated when introduced into the wellbore. The encapsulated component may be released so as to contact the other components of the LCCC in a downhole portion of the wellbore near, proximate to, or within the LCZ. When the components of the LCCC are allowed to contact, the LCCC may gel or begin to gel. Thus, by contacting the LCCC components within the LCZ, the gel will form within the LCZ.

In another exemplary embodiment, the separate introduction of at least two of the LCCC components may be achieved by introduction via two or more independent fluid streams. That is, a first component may be introduced into the wellbore, formation, or LCZ via a first flowpath and a second component may be introduced via a second flowpath which is separate from the first flowpath. The introduction of fluids into a wellbore via two or more flowpaths is known to those of skill in the art, for example, via flow inside a tubular and an annular spaced defined by the tubular and the wellbore. Introduction into the wellbore via two or more flowpaths may provide several advantages to the operator. For example, the first component of the LCCC may be included within a drilling fluid which is circulated through the wellbore during drilling operations. If an LCZ is encountered during drilling operations, a second component may be introduced into the wellbore via a flowpath separate from the flowpath by which the drilling fluid is circulated. Utilizing a gellable composition which sets instantaneously or substantially instantaneously causes gellation to occur where, or substantially near where, the first component and the second component come into contact. Thus, utilizing multiple flowpaths may allow the operator to plug or seal an LCZ without entirely ceasing drilling operations. By causing the LCCC within the drilling to set, the operator does not need to remove the drilling equipment and drilling fluid from the wellbore. The operator may thereby resume drilling operations more quickly, the LCZ having been plugged or sealed.

In still another exemplary embodiment, the separate introduction of at least two of the LCCC components may be achieved by introducing the components within a single flowpath, but being separated by a spacer. Such a spacer may comprise a highly viscous fluid which substantially or entirely prevents the intermingling of the LCCC components while being pumped into a wellbore. Such spacers and methods of using the same are generally known to those of ordinary skill in the art. Once introduced to the subterranean formation the LCCC may enter the LCZ and set to form a mass that substantially inhibits or eliminates lost circulation.

In an embodiment, the LCCC introduced into the wellbore may be suitable for preventing the loss of fluids to LCZs or other undesirable flowpaths having particularly large voids, pores, spaces, fractures, or vugular zones. Such voids, pores, spaces, fractures, or vugular zones may comprise cavities having diameters equal to or greater than about 200 microns, alternatively equal to or greater than about 150 microns, alternatively equal to or greater than about 100 microns. Further, such voids, pores, spaces, fractures, or vugular zones may comprise slots widths ranging from 500 to 5000 microns, alternatively, from 750 to 4500 microns, alternatively, from 1000 to 4000 microns, alternatively, from 1500 to 3500 microns. Such an LCCC will be referred to herein as a Large-Pore LCCC(XC) and the voids, pores, spaces, fractures or vugular zones are hereinafter collectively referred to as cavities.

In an embodiment, the XC may comprise a base fluid a thixotropic viscosifier comprising a synthetic hectorite clay (e.g., THERMA-VIS) and a gellable composition comprising poly(acrylamide-co-acrylate) (HZ-10) and a polyethylenimine crosslinker (HZ-20). The XC may also comprise a blend of particulate materials comprising resilient materials such as graphite (e.g., Duo-Squeeze H). THERMA-VIS, HZ-10, HZ-20, and DUO-SQUEEZE H are commercially available from Halliburton Energy Services, Inc.

In an embodiment, the method of combating lost circulation may comprise introducing the XC into an LCZ or undesirable flowpath having cavities of the size described previously herein. The XC may be an effective means of combating lost circulation in an LCZ or flowpath having pores of that size. The XC may be introduced as a single fluid or pill as described previously herein. Not seeking to be bound by any particular theory, the components of the XC may work synergistically to combat lost circulation. For example, as the XC is introduced into the LCZ or flowpath, the bridging material may "bridge" some portion of the cavities equal to or greater than approximately the diameter or width of the LCZ or flowpath, thereby causing a reduction in the shear stress applied to the XC. As the shear stress applied to the XC lessens, the thixotropic behavior of the thixotropic viscosifier causes the XC to viscosify. The increased viscosity of the XC due to the action of the thixotropic primary voscosifier will cause the XC to remain in place while the gellable composition begins to set. Thus an XC of the type described herein may rapidly develop set gels at low or zero shear. The set XC may form a ringing gel. As used herein, the term "ringing gel" means a substantially non-flowing gel with dimensional stability (e.g., when a glass bottle containing the gel is tapped on a surface, the container and the gel vibrate as a single entity). Thus, the synergistic action of the components of the XC and methods of using the same may be particularly advantageous for preventing the loss of fluid to an LCZ or flowpath having voids, pores, spaces, fractures, or vugular zones of the size previously described herein. Further, the XC may be characterized by thermal stability. As used herein, the term "thermal stability" means there is no loss in viscosity nor is syneresis experienced by excluding water when kept at an elevated temperature (e.g., above about 300° F.).

In an embodiment, the LCCC introduced into the wellbore may be designed for use in a situation where a solids-free or water-thin LCCC is desired, referred to herein as a Solids-Free LCCC(YC). In an embodiment, the YC comprises a base fluid and a gellable composition. The base fluid may comprise at least 75% by weigh of the YC, alternatively, at least 90%, alternatively, at least 95%. The gellable composition may comprise less than 25% by weight of the YC, alternatively, less than 10%, alternatively, less than 5%.

In an embodiment, the base fluid of the YC comprises an aqueous fluid or a substantially aqueous fluid and, optionally, a salt. When present, the salt may be present in an amount ranging from about 1% to a saturated solution.

In an embodiment, the gellable composition comprises a LVGS as described herein above. In an embodiment, the LVGS suitably employed in the YC comprises a soluble polymerizable monomeric acrylate of an alkaline earth metal, a multifunctional cross-linking unsaturated monomer, a redox polymerization initiator, a polymerization rate moderator, and, optionally, a redox polymerization rate retarder.

In another embodiment, the initiator of the LVGS comprises a water-soluble azo-initiator (e.g., PERM C™ and PERM D™, both commercially available from Halliburton Energy Services, Inc. In an embodiment, the YC may be advantageously employed where it is desirable to have a gel time within the foregoing ranges.

In an embodiment, the initiator of the LVGS comprises a combination of alkoanolamine (e.g., triethanoloamine) and sodium or ammonium persulfate. When activated, the gellable composition may form a gel in an amount of time ranging form 0 to about 60 minutes at room temperature, alternatively, from about 30 seconds to 30 minutes, alternatively, from about 1 minute to about 20 minutes. The gel time may be adjustable via the ratio of alkanolamine to persulfate or by employing a retarder (e.g. potassium ferricyanide). The use of retarders to adjust gel time is generally known to those of skill in the art.

In an embodiment, the YC may be characterized as tolerant of high salinity conditions. As used herein, the term "tolerant" means the gel time is not significantly altered and or no component of a composition is precipitated upon exposure. In an embodiment, the YC may also be advantageously employed where a brine or heavy brine is desired as the base material (e.g., where the YC will be used, for instance, within or proximate to a salt dome).

In an embodiment, the YC may be characterized as water-thin. Alternatively, the YC may be characterized as having a viscosity of less than about 5 cP, alternatively less than about 10 cP, alternatively, less than about 15 cP. Furthermore, in an embodiment the YC may be substantially free of solids. As used herein, substantially free solids means that YC comprises less than about 10% by weight of any solid or particulate component, alternatively less than about 9%, 8%, 7%, 6%, 5%, 4%, 3%, 2% or 1% of a solid or particulate component. In an embodiment, the YC may be advantageously employed to combat lost circulation in an LCZ or a flowpath having pores ranging in size from greater than about 200 microns, alternatively, greater than or equal to about 150 microns, alternatively, greater than or equal to about 100 microns. Not seeking to be bound by theory, relatively low viscosity of the YC comprises allows the YC to be placed within a relatively small pore (e.g., a pore where it would be difficult or impossible to place a higher viscosity fluid therein). In an embodiment, the YC may be advantageously employed to combat lost circulation in an LCZ or flowpath having pores ranging in size voids, pores, spaces, fractures, or vugular zones may comprise slots widths ranging from 500 to 5000 microns, alternatively, from 750 to 4500 microns, alternatively, from 1000 to 4000 microns, alternatively, from 1500 to 3500 microns. In an embodiment, the YC components are allowed to come into contact within an LCZ by introducing the components into the wellbore as separate streams. The YC components may be allowed to form a crosslinked gel. In an embodiment, the crosslinked gel may form in about less than 5 min. In an embodiment, at least one of the streams containing one reactive components contains a thixotropic viscosifier. In an embodiment, at least one of the streams containing one reactive component contains a thixotropic viscosifier and a bridging particle.

The gel formed upon setting of the YC may be a highly rubbery gel having good dimensional stability. As will be understood by one of ordinary skill in the art, use of a LVGS as described herein may provide for a final product that can be characterized as having a reduced toxicity when compared to materials formed from cross-linking, non-ionic, water soluble monomers with olefinic unsaturation.

In an embodiment, the method of combating lost circulation may comprise introducing an YC into an LCZ having particularly small pores. As discussed above, the YC will be free or substantially free of solid or particulate materials. Furthermore, the YC may be substantially water-thin. Thus, not seeking to be bound by any particular theory, when introduced into an LCZ having particularly small pores, the YC may flow into such small pores. As discussed above, the YC may set substantially instantaneously or in a relatively short amount of time. Thus, the YC may set quickly upon being introduced into the LCZ. Further, the YC may be introduced into the wellbore, formation, or LCZ as two or more components via the means discussed above. In such an embodiment, the YC may set instantaneously or substantially instantaneously upon the components thereof coming into contact.

In an embodiment, the method of combating lost circulation may comprise introducing an YC into an LCZ within a salt dome (i.e., an area of where the formation comprises a relatively high proportion of saline crystals, often to the extent that the integrity of the formation would be altered by the removal of the saline crystals). As will be understood by one of skill in the art, when working in, near, or around salt domes, it may be necessary to utilize saturated or nearly saturated aqueous wellbore servicing fluid because an unsaturated aqueous wellbore servicing fluid could cause the dissolution of the salt from the formation, thereby resulting in the loss of the structural integrity of the formation. Thus, it may be advantageous to utilize a saturated aqueous wellbore servicing fluid utilized in, near, around a salt dome. Alternately, salt solutions may be useful in preventing clay swelling or shale swelling while drilling through zones comprising such materials. Alternately, salt solutions may be employed to increase density of LCCC. When a saturated aqueous solution is used as the base fluid of an LCCC, the gellable composition utilized therewith must tolerate salinity. In an embodiment, the gellable composition of the YC will tolerate high salinity conditions and, thus, may be advantageously utilized with a saturated aqueous wellbore servicing fluid. As such, the YC may be utilized to combat lost circulation in, near, or around salt domes.

EXAMPLES

Example 1

A YC was prepared by contacting a magnesium acrylate present in an amount of about 10% by weight of the final solution, triethanolamine, and a redox polymerization initiator and allowed to gel at room temperature. The amount of each component and the gel time for each sample are presented in Table 1.

TABLE 1

| Sample No. | Acrylate (cc)[1] | Water (cc) | Triethanolamine (85%) in cc | Redox initiator(g)[2] | Gel time at room temperature |
|---|---|---|---|---|---|
| 1 | 10 | 30 | 0.67 | 0.8 | Immediate |
| 2 | 10 | 30 | 0.34 | 0.8 | 2 min. |
| 3 | 10 | 30 | None | 0.8 | No gel in 18 hrs. |
| 4 | 2.5 | 20 | 0.2 | 0.2 | 5 min. - weak gel |
| 5 | 5 | 15 | 0.37 | 0.2 | 40 sec. |
| 6 | 5 | 15 | 0.37 | 0.6 (encapsulated)[3] | No gel at room temperature in 1 hr. Gelled at 165° F. in 2 min. |
| 7 | 5 | 15 (2.7% KCl) | 0.37 | 0.4 | Immediate |
| 8 | 5 | 15 (2.7% KCl) | 0.18 | 0.4 | 2 min. |
| 9 | 3.5 | 10.5 | 0.25 | 0.3 (NaBO$_3$) | 46 hrs. |
| 10 | 3.5 | 10.5 | 0.25 | 0.3 (Na$_2$CO$_3$) | 18 hrs. |
| 11 | 2.5 | 7.5 | None | 0.2 | Less than 15 min. at 65° F. |
| 12 | 2.5 | 7.5 | Polyethyleneimine[4] (0.2 cc) | 0.2 | 2 min. |
| 13 | 2.5 | 7.5 | 0.2 cc + 0.4 cc of 1% K$_3$[Fe(CN)$_6$] | 0.2 | 4 min. |

[1]The Acylate (40% aqueous solution) utilized here was AC-400 from De Neef Corporation.
[2]The redox polymerization initiator utilized here was sodium persulfate (Na2S2O8) unless otherwise stated.
[3]Encapsulated ammonium persulfate [(NH4)2S2O8] is available from Halliburton Energy Services, Inc. as OPTIFLO II.
[4]Available from Halliburton Energy Services, Inc. as HZ20 ™.

Referring to Sample Nos. 7 and 8, the results demonstrate that an aqueous salt solution can be employed in the YC without significantly effecting the gel time. The results also indicate that selection of suitable redox polymerization initiator such as sodium perborate or sodium percarbonate, extended gel times can be realized. Encapsulation of the oxidizer also provides prolonged fluid duration (e.g., as in Sample No. 6). The results also demonstrate that polymeric amines can be used in place of triethanolamine. The resultant gels are thermally stable retaining their shape and as-gelled dimensions for at least 2 weeks at 165° F. Additionally, Sample 13 demonstrates that a ferricyanide salt may be employed in the composition to extend gel time.

Example 2

A YC was formed using a water-soluble azo initiator to form a single fluid based pill. Samples 14 to 18 have the indicated compositions.

TABLE 2

| Sample No. | Acrylate (cc)[1] | Water (cc) | Azo Initiator (mg) | Gel time at F. |
|---|---|---|---|---|
| 14 | 5 | 15 | 20 (Perm C) | 15 min @150 F. |
| 15 | 5 | 15 (4% KCl) | 20 (Perm C) | 15 min @150 F. |
| 16 | 5 | 15 (12% KCl + 5% $MgCl_2 \cdot 6H_2O$) | 20 (Perm C) | 15 min @150 F. |
| 17 | 5 | 15% (1% sodium acetate) | 20 (Perm C) | 15 min @150 F. |
| 18 | 5 | 15% (1% sodium citrate) | 20 (Perm C) | 15 min @150 F. |

[1]AC-400 (40% solution in water) from De Neef Corporation
[2]Small amounts of free water form in 24 hrs in all cases.

PERM C is a low temperature initiator with a high temperature limit of about 140° F. to 150° F. Other high temperature water-soluble initiators, for example azo initiators such as PERM D are also available for higher temperature applications. The results in Table 2 demonstrate that salt solutions containing monovalent or divalent cations may be employed in the LCCCs of this disclosure without interfering with the gelation reaction. Similar results were observed with the methacrylate based systems and these results are presented in Table 3.

TABLE 3

| Sample No | Methacrylate (cc)[1] | Water (cc) | Triethanolamine 85% in cc | Redox Inititor (sodium persulfate)(g) | Perm C Azo initiator (mg) | Gel time at room temperature |
|---|---|---|---|---|---|---|
| 1 | 10 | 10 | .039 | 0.23 | | 1 min |
| 2 | 10 | 10 | — | — | | No gel even at 150 F. |
| 3 | 10 | 10 | — | — | 20 | Gelled at 150 F. in 15 min |

[1]Superflex™ from De Neef Corporation

It was noted however that the methacrylate-based systems produced gels that were elastic and mechanically stronger than those produced by the acrylate-based systems.

Example 3

A 10 ppg XC was prepared using a base formulation comprising 3.0 wt. % VIS I, 2 wt. % VIS II. 2 X-LINK I, and 40 ppb DUO SQUEEZE H. DUO-SQUEEZE H is a high fluid loss circulation treatment, X-LINK I is a synthetic polymer, VIS I is a synthetic macromolecule; and VIS II is a synthetic copolymer; all of which are commercially available from Halliburton Energy Services, Inc. The initial rheological profile of the XC was determined. At room temperature, the rheological properties of the fluid were measured using a FANN 35 viscometer at 3, 6, 10, 100, 200, 300, and 600 RPM. The results are shown in Table 4 and FIG. 2.

TABLE 4

Figure 2:
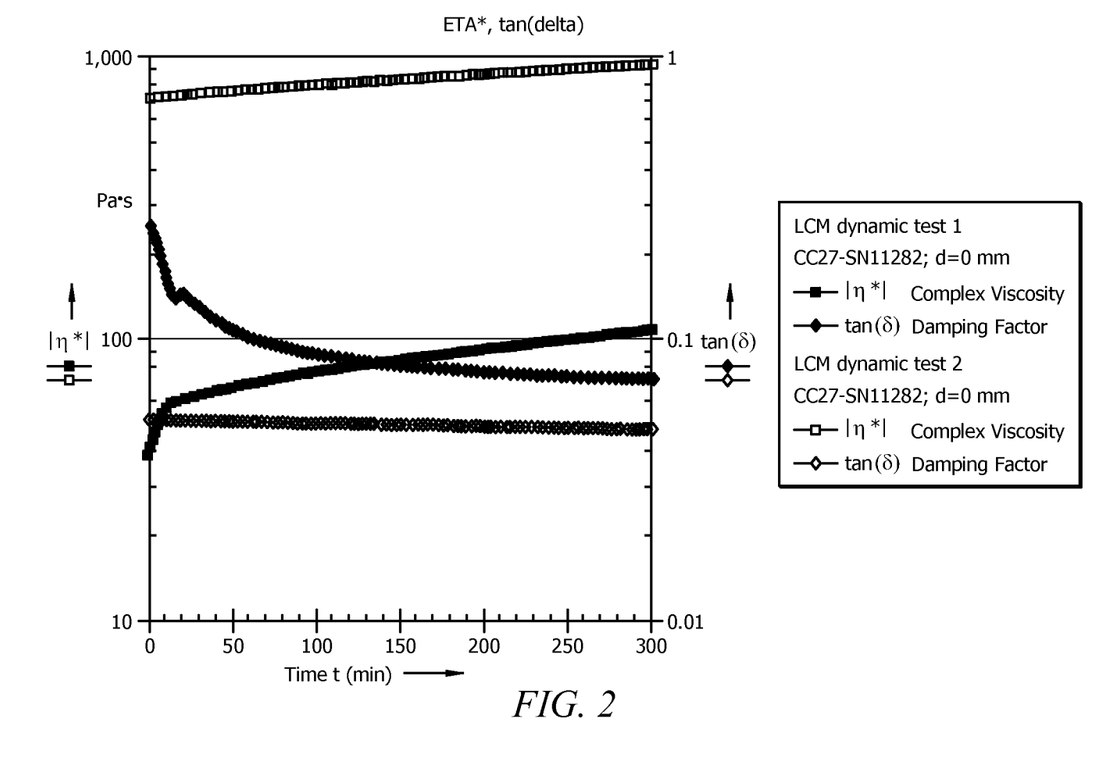
FIG. 2 is a rheological profile of the samples from Example 3.

| FANN 35 | 150 F. |
|---|---|
| 600 | 200 |
| 300 | 120 |
| 200 | 90 |
| 100 | 57 |
| 6 | 26 |
| 3 | 24 |
| 10 s | 28 |

The results demonstrate the thixotropic viscosifier (Therma-vis) allows for the unique ability of the fluid to develop rapid gels at low or zero shear. This behavior helps hold the fluid in place while the secondary viscosifier (HZ-10) and cross-linker (HZ-20) thermally-activate to form a ringing gel and efficiently close off the loss zone. DUO-SQUEEZE H is added as a sized mix of particles to aid in closing off of the zone until the gelatin sets. The other unique aspect of the system is the ability to tune the viscosity of the initial fluid; the gel set time, the gel strength and the activation temperature. It can be observed that the fluid exhibits very thixotropic behavior, but at low shear rates a rapid gel increase is seen. Upon thermal application, a rigid gel forms and can be seen via dynamic studies with the Anton PAAR control stress rheometer.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Whenever a numerical range with a lower limit and an upper limit is disclosed, any number and any included range falling within the range is specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc. Also, the terms in the claims have their plain, ordinary meaning unless otherwise explicitly and clearly defined by the patentee.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A method of servicing a wellbore in a subterranean formation comprising:
    introducing a first component of a lost circulation combating composition within a drilling fluid, wherein the first component comprises a gellable composition in an amount from about 0.2 weight percent (wt. %) to about 30 wt. % of the lost circulation combating composition and the drilling fluid is circulated through the wellbore during drilling operations;
    introducing a second component of the lost circulation combating composition into the wellbore via a flowpath separate from the flowpath by which the drilling fluid is circulated; and
    forming the lost circulation combating composition within a lost circulation zone;
    wherein the second component comprises an initiator; and
    wherein the gellable composition comprises polymerizable monomers that include:
        a metal acrylate; and
        a cross-linking multifunctional monomer present in an amount from about 0.01 wt. % to about 5 wt. % by weight of the polymerizable monomers, the cross-linking multifunctional monomer being selected from the group consisting of ethylene bisacrylamide, methylene bisacrylamide, trimethylol propane triacrylate, trimethylol propylene diacrylate, ethyleneglycol triacrylate, pentaerythrytol triacrylate, pentaerythrytol diacrylate, triallylcyanurate, and combinations thereof; and
    wherein the lost circulation combating composition further comprises a polymerization rate moderator selected from the group consisting of morpholine, tetramethylethylenediamine, polyethylenimine, triethanolamine, and ammonium carbonate, the polymerization rate moderator being present in an amount from about 3 wt. % to about 25 wt. % by weight of the drilling fluid.

2. The method of claim 1, wherein the initiator comprises: a mixture of an alkanolamine and a persulfate; an azo initiator; or a combination thereof.

3. The method of claim 1, wherein the metal acrylate comprises a calcium salt of acrylic acid, a magnesium salt of acrylic acid, a calcium salt of methacrylic acid, a magnesium salt of methacrylic acid, or combinations thereof.

4. The method of claim 1, wherein the initiator comprises 2,2'-azobis(2-(2-imidazolin-2-yl)propane) dihydrochloride or 2,2'-azobis(2-methyl-N-2-hydroxyethyl)propionamide.

5. The method of claim 1, wherein the initiator comprises an organic peroxide or organic hydroperoxide.

6. The method of claim 1, wherein the initiator comprises benzoyl peroxide or tert-butyl hydroperoxide.

7. The method of claim 1, wherein the initiator comprises sodium persulfate ($Na_2S_2O_8$), ammonium persulfate, sodium percarbonate ($Na_2CO_3$), sodium perborate ($NaBO_3$), or a combination thereof.

8. The method of claim 1, wherein the initiator is encapsulated.

* * * * *